United States Patent
Wu et al.

(10) Patent No.: US 8,620,004 B2
(45) Date of Patent: Dec. 31, 2013

(54) ELECTRONIC DEVICE, ELECTRONIC SYSTEM, AND METHOD FOR PROCESSING SIGNALS FROM AN AUDIO ACCESSORY THEREOF

(75) Inventors: Szu-Chen Wu, Taoyuan County (TW); Yu-Chi Hsu, Taoyuan County (TW); Ping-Huang Yang, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 515 days.

(21) Appl. No.: 12/915,052

(22) Filed: Oct. 29, 2010

(65) Prior Publication Data
US 2011/0103608 A1    May 5, 2011

Related U.S. Application Data

(60) Provisional application No. 61/255,870, filed on Oct. 29, 2009.

(51) Int. Cl.
*H04R 1/10* (2006.01)

(52) U.S. Cl.
USPC .......................................................... 381/74

(58) Field of Classification Search
USPC .......................................................... 381/74
See application file for complete search history.

(56) References Cited

U.S. PATENT DOCUMENTS

| | | |
|---|---|---|
| 6,970,752 B1 | 11/2005 | Lim |
| 2006/0009868 A1 | 1/2006 | Park |
| 2008/0164994 A1 | 7/2008 | Johnson |
| 2008/0318629 A1 | 12/2008 | Inha |
| 2009/0179768 A1 | 7/2009 | Sander |
| 2009/0179789 A1 | 7/2009 | Haughay, Jr. |
| 2009/0180353 A1 | 7/2009 | Sander |
| 2009/0180354 A1 | 7/2009 | Sander |
| 2009/0180629 A1 | 7/2009 | Sander |

(Continued)

FOREIGN PATENT DOCUMENTS

| | | |
|---|---|---|
| CN | 1336659 A | 2/2002 |
| CN | 1719426 A | 1/2006 |

(Continued)

OTHER PUBLICATIONS

Office action mailed on Dec. 31, 2012 for the China application No. 201010530098.3, filed Oct. 29, 2010, p. 1-10.

(Continued)

*Primary Examiner* — Alexander Jamal
(74) *Attorney, Agent, or Firm* — Winston Hsu; Scott Margo

(57) ABSTRACT

An electronic device includes an audio jack, a power supply unit, a determining circuit, and an executing circuit. The audio jack may be arranged for transmitting an audio input signal, and the electronic device may be configured to connect with an audio accessory via the audio jack. When the audio accessory may be connected to the electronic device, the power supply unit provides a first voltage to the audio jack and a second voltage. The determining circuit determines whether to trigger an interrupt request according to the second voltage and a third voltage, wherein the third voltage may be coupled to the audio jack and may be generated according to the first voltage. The executing circuit may be coupled to the determining circuit, for determining whether to execute a corresponding function according to the third voltage when the interrupt request may be received.

20 Claims, 8 Drawing Sheets

(56) References Cited

U.S. PATENT DOCUMENTS

| | | |
|---|---|---|
| 2009/0180630 A1 | 7/2009 | Sander |
| 2009/0180642 A1 | 7/2009 | Sander |
| 2009/0180643 A1* | 7/2009 | Sander et al. ............ 381/111 |
| 2009/0180659 A1 | 7/2009 | Sander |

FOREIGN PATENT DOCUMENTS

| | | |
|---|---|---|
| CN | 1856183 A | 11/2006 |
| EP | 1 156 587 A2 | 11/2001 |
| EP | 1 615 465 A2 | 1/2006 |
| JP | P2005108372 A | 4/2005 |
| KR | 20030018845 A | 3/2003 |
| KR | 1020050019313 A | 3/2005 |
| KR | 1020070063769 A | 6/2007 |
| TW | 380794 | 1/2000 |
| TW | M258536 | 3/2005 |
| TW | M306440 | 2/2007 |
| TW | M312150 | 5/2007 |

OTHER PUBLICATIONS

Search report issued on Jun. 29, 2011 for EP application No. 10014142.3, filing date Oct. 29, 2010, pp. 1-3.

Office action mailed on Sep. 24, 2013 for the China application No. 201010530098.3, filing date Oct. 29, 2010, p. 1-9.

* cited by examiner

|  | Predetermined voltage range | |
|---|---|---|
|  | Maximum voltage | Minimum voltage |
| Button key1 | 2.7V | 2.3V |
| Button key2 | 3.3V | 2.9V |
| Button key3 | 3.8V | 3.4V |

(10A)

|  | Predetermined voltage range | |
|---|---|---|
|  | Maximum voltage | Minimum voltage |
| Button key1 | 0x115 (277) | 0xEB (235) |
| Button key2 | 0x152 (338) | 0x128 (296) |
| Button key3 | 0x186 (390) | 0x15C (348) |

ELECTRONIC DEVICE, ELECTRONIC SYSTEM, AND METHOD FOR PROCESSING SIGNALS FROM AN AUDIO ACCESSORY THEREOF

CROSS REFERENCE TO RELATED APPLICATIONS

This application claims the priority of U.S. Provisional Application No. 61/255,870 filed Oct. 29, 2009, which is included herein by reference.

BACKGROUND OF THE INVENTION

1. Field of the Invention

The present disclosure relates to an electronic device, an electronic system and a related method for processing signals from an audio accessory, and more particularly, to a device and method capable of executing corresponding functions on an electronic device by implementing a plurality of keys on an audio accessory without increasing extra pin(s) of the audio accessory.

2. Description of the Prior Art

Electronic devices equipped with multimedia playback functions, such as an mp3 player, a CD player, a mobile phone, or a personal digital assistant (PDA), are capable of playing audio signals anywhere. Generally speaking, such electronic devices include a specific audio output interface for outputting the audio signals to an audio playback device. For example, the mp3 player may include a 3.5 mm standard audio jack for outputting the audio signals to an audio output device such as a speaker or a headphone.

Please refer to FIG. 1 together with FIG. 2. FIG. 1 is a diagram showing a conventional audio plug 100 with three pins, and FIG. 2 is a diagram showing a conventional audio plug 200 with four pins. The audio plug 100 includes a first pin 110 for transmitting an L-channel signal, a second pin 120 for transmitting an R-channel signal and a third pin 130 coupled to a ground terminal. The audio plug 200 includes a first pin 210 for transmitting an L-channel signal, a second pin 220 for transmitting an R-channel signal, a third pin 230 coupled to a ground terminal, and a fourth pin 240 for transmitting an audio input signal (for example, a signal from a microphone). However, no matter whether the audio plug 100 or the audio plug 220 may be used, audio input functions and/or audio output functions may be supported, while other functions may not be achieved.

SUMMARY OF THE INVENTION

It is therefore one of the objectives of the present disclosure to provide an electronic device, an electronic system, and a method for processing signals from an audio accessory to solve the abovementioned problems.

According to one embodiment, an electronic device is provided. The electronic device includes an audio jack, a power supply unit, a determining circuit, and an executing circuit. The audio jack may be arranged for transmitting an audio input signal, wherein the electronic device may be configured to connect with an audio accessory via the audio jack. The power supply unit may be coupled to the audio jack, and may be arranged for providing a first voltage to the audio jack and a second voltage when the audio accessory may be configured to connect to the electronic device. The determining circuit may be coupled to the power supply unit and the audio jack, and may be arranged for receiving the second voltage and a third voltage, and for determining whether to trigger an interrupt request according to the second voltage and the third voltage, wherein the third voltage may be coupled to the audio jack and may be generated according to the first voltage. The executing circuit may be coupled to the determining circuit and the power supply unit, and may be arranged for determining whether to execute a corresponding function according to the third voltage when the interrupt request may be received.

According to another embodiment, an electronic system may be provided. The electronic system includes an audio accessory and an electronic device. The audio accessory includes an audio plug, an audio output unit, an audio input unit, and a control element. The audio plug includes a first pin for transmitting a first channel signal, a second pin for transmitting a second channel signal, a third pin coupled to a ground terminal, and a fourth pin for transmitting an audio input signal. The audio output unit may be coupled to the first pin and the second pin, and may be arranged for outputting the first channel signal and the second channel signal. The audio input unit may be coupled to the fourth pin, and may be arranged for receiving the audio input signal. The control element may be coupled between the audio input unit and the fourth pin of the audio plug, and includes at least one button. The electronic device includes an audio jack, a power supply unit, a determining circuit, and an executing circuit. The audio jack includes a first terminal corresponding to the first pin of the audio plug, a second terminal corresponding to the second pin, a third terminal corresponding to the third pin, and a fourth terminal corresponding to the fourth pin, wherein the electronic device may be configured to connect with the audio plug of the audio accessory via the audio jack. The power supply unit may be coupled to the fourth terminal of the audio jack, and may be arranged for providing a first voltage to the fourth terminal of the audio jack and a second voltage when the audio accessory connects to the electronic device. The determining circuit may be coupled to the power supply unit and the fourth terminal of the audio jack, and may be arranged for receiving the second voltage and a third voltage, and for determining whether to trigger an interrupt request according to the second voltage and the third voltage, wherein the third voltage may be coupled to the fourth terminal and may be generated according to the first voltage. The executing circuit may be coupled to the determining circuit and the power supply unit, and may be arranged for determining whether to execute a corresponding function according to the third voltage when the interrupt request may be received.

According to another embodiment, a method for processing signals from an audio accessory applied to an electronic device may be provided. The electronic device includes an audio jack for connecting with the audio accessory, and the audio jack includes a terminal for transmitting an audio input signal. The method includes the following steps: when the audio accessory connects to the electronic device, providing a first voltage and a second voltage; determining whether to trigger an interrupt request according to the second voltage and a third voltage, wherein the second voltage may be coupled to the terminal and may be generated according to the first voltage; and determining whether to execute a corresponding function according to the third voltage when the interrupt request may be received.

These and other objectives of the present disclosure will no doubt become obvious to those of ordinary skill in the art after reading the following detailed description of the preferred embodiment that may be illustrated in the various figures and drawings.

BRIEF DESCRIPTION OF THE DRAWINGS

FIG. 10 (including sub-diagrams 10A and 10B) is a diagram illustrating an embodiment of the predetermined voltage range mentioned in FIG. 8 and FIG. 9.

DETAILED DESCRIPTION

Figure 1:
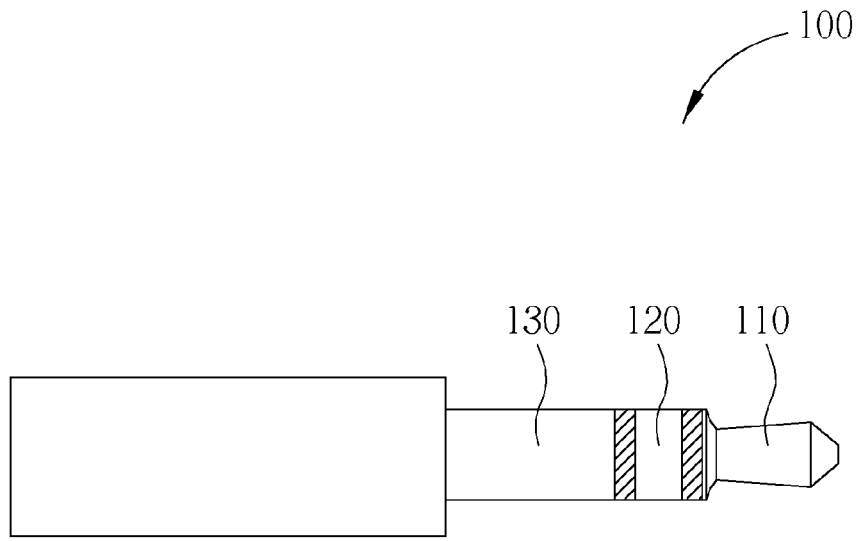
FIG. 1 is a diagram showing a conventional audio plug with three pins.
Figure 2:
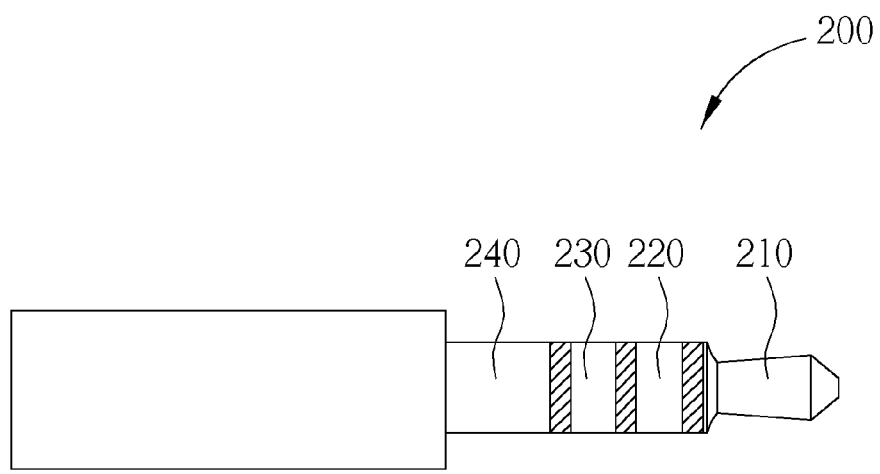
FIG. 2 is a diagram showing a conventional audio plug with four pins.
Figure 3:
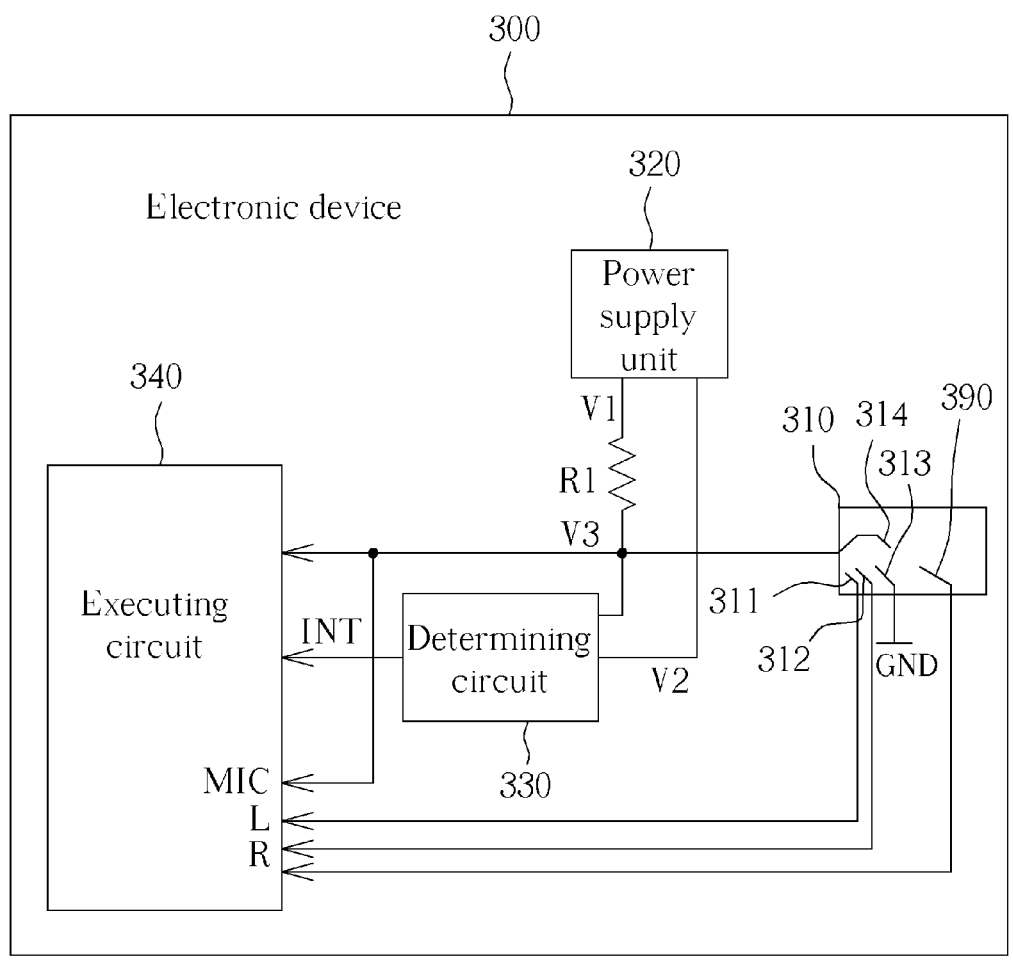
FIG. 3 is a block diagram of an electronic device according to an embodiment of the present disclosure.

Please refer to FIG. 3. FIG. 3 is a block diagram of an electronic device 300 according to an embodiment of the present disclosure. As shown in FIG. 3, the electronic device 300 includes an audio jack 310, a power supply unit 320, a determining circuit 330, and an executing circuit 340. The audio jack 310 includes four terminals 311~314, wherein the first terminal 311 may be used for transmitting a first channel signal L, the second terminal 312 may be used for transmitting a second channel signal R, the third terminal 313 may be coupled to a ground terminal GND, and the fourth terminal 314 may be used for transmitting an audio input signal MIC. Please note that the electronic device 300 may be configured to connect with an audio accessory (such as the audio accessory 400 shown in FIG. 4 and FIG. 5) via the audio jack 310. The power supply unit 320 may be coupled to the fourth terminal 314 of the audio jack 310. When an audio accessory connects to the electronic device 300, the power supply unit 320 may be arranged for providing a first voltage V1 to the fourth terminal 314 of the audio jack 310 as well as the second voltage V2. The determining circuit 330 may be coupled to the power supply unit 320 and the fourth terminal 314 of the audio jack 310, for receiving the second voltage V2 and a third voltage V3, and for determining whether to trigger an interrupt request INT according to the second voltage V2 and the third voltage V3, wherein the third voltage V3 may be coupled to the fourth terminal 314 of the audio jack 310 and may be generated according to the first voltage V1. In this embodiment, the electronic device 300 further includes a resistive element R1 coupled between the first voltage V1 provided by the power supply unit 320 and the fourth terminal 314 of the audio jack 310, for generating the third voltage V3 according to the first voltage V1. For example, the third voltage V3 may be generated through the voltage-divider theorem. Afterwards, the executing circuit 340 may be coupled to the determining circuit 330 and the power supply unit 320. When the executing circuit 340 receives the interrupt request INT, the executing circuit 340 determines whether to execute a corresponding function according to the third voltage V3.

Figure 4:
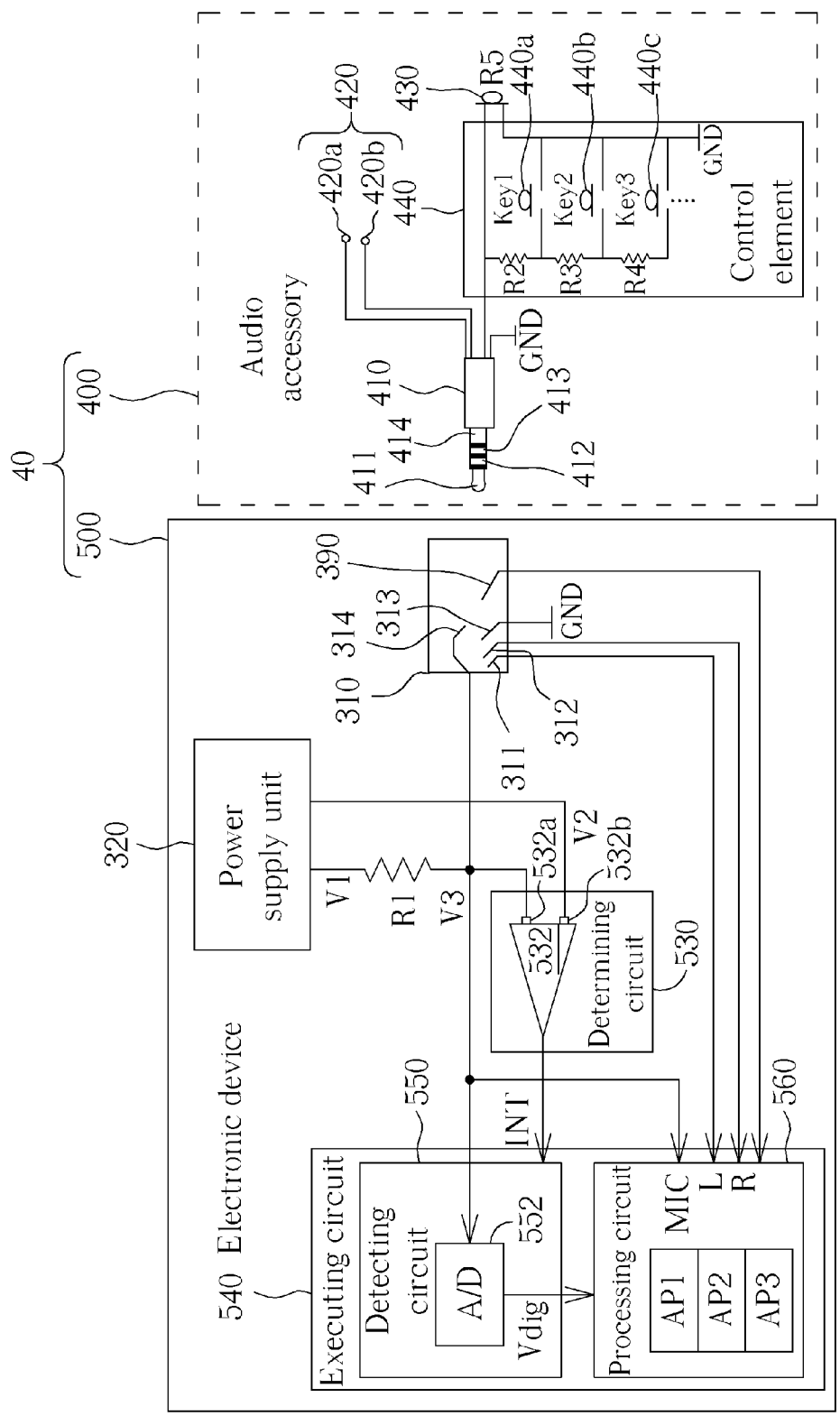
FIG. 4 is a block diagram of an electronic system according to an embodiment of the present disclosure.

Please refer to FIG. 4 together with FIG. 3. FIG. 4 may be a block diagram of an electronic system 40 according to an embodiment of the present disclosure. As shown in FIG. 4, the electronic system 40 includes an electronic device 500 and an audio accessory 400, wherein the architecture of the electronic device 500 may be similar to that of the electronic device 300 shown in FIG. 3, and thus the description may be not repeated here. In this embodiment, the determining circuit 530 of the electronic device 500 may be implemented by a comparator 532. The comparator 532 may be coupled to the power supply unit 320, the fourth terminal 314 of the audio jack 310, and the executing circuit 540. The comparator 532 includes a first input end 532a and a second input end 532b, wherein the first input end 532a may be arranged for receiving the third voltage V3, and the second input end 532b may be arranged for receiving the second voltage V2. Therefore, the comparator 532 may be arranged for comparing the second voltage V2 with the third voltage V3 to generate a comparing result, and for determining whether to trigger the interrupt request INT according to the comparing result. As an illustration, when the third voltage V3 may be greater than the second voltage V2, the comparator 532 will trigger the interrupt request INT; when the third voltage V3 may be not greater than the second voltage V2, the comparator 532 will not trigger the interrupt request INT. Please note this may be presented merely for describing the present disclosure, and in no way should be considered to be limitations of the scope of the present disclosure.

Furthermore, in this embodiment, the executing circuit 540 of the electronic device 500 may be implemented by a detecting circuit 550 and a processing circuit 560, and the detecting circuit 550 further includes an analog-to-digital converter 552. The detecting circuit 550 may be coupled to the determining circuit 530. When the detecting circuit 550 receives the interrupt request INT, the analog-to-digital converter 552 of the detecting circuit 550 will receive the third voltage V3 and perform an analog to digital conversion upon the third voltage V3 to generate a digital voltage Vdig. Afterwards, the processing circuit 560 may be coupled to the detecting circuit 550 and the audio jack 310, for determining whether to execute the corresponding function according to at least the digital voltage Vdig. In this embodiment, three functions AP1, AP2, and AP3 may be cited as an example for illustration. Those skilled in the art, however, should appreciate that the number of functions given here should in no way be considered to be limitations of the scope of the present disclosure. What calls for special attention may be that: in this embodiment, these functions AP1, AP2, and AP3 correspond to a plurality of buttons key1, key2, and key3 of a control element 440 of the audio accessory 400, respectively.

Please keep referring to FIG. 4. The audio accessory 400 includes an audio plug 410, an audio output unit 420, an audio input unit 430, and a control element 440. The electronic device 500 may be configured to connect with the audio plug 410 of the audio accessory 400 via the audio jack 310. That is, the audio plug 410 includes four pins 411~414, wherein the first pin 411 corresponds to the first terminal 311 of the audio jack 310, the second pin 412 corresponds to the second terminal 312 of the audio jack 310, the third pin 413 corresponds to the third terminal 313 of the audio jack 310, and the fourth pin 414 corresponds to the fourth terminal 314 of the audio jack 310. In other words, when the audio plug 410 of the audio accessory 400 is configured to connect with (is plugged into) the audio jack 310 of the electronic device 500, the first pin 411 may be electronically connected to the first terminal 311 of the audio jack 310, the second pin 412 may be electronically connected to the second terminal 312 of the audio jack 310, the third pin 413 may be electronically connected to the third terminal 313 of the audio jack 310, and the fourth pin 414 may be electronically connected to the fourth terminal 314 of the audio jack 310. The audio output unit 420 includes a first output unit 420a and a second output unit 420b (such as a pair of headphones or a pair of speakers) respectively coupled to the first pin 411 and the second pin 412, for outputting the first channel signal L and the second channel signal R. In addition, the audio input unit 430 may be implemented by a microphone. Generally speaking, the microphone usually includes an internal resistor R5, wherein a first end of the internal resistor R5 may be electronically connected to the fourth pin 414 of the audio plug 410, and a second end of the internal resistor R5 may be electronically connected to the ground terminal GND, as may be shown in FIG. 4.

Moreover, the control element 440 may be coupled between the audio input unit 430 and the fourth pin 414 of the audio plug 410, wherein the control element 440 includes at least one button. In this embodiment, three buttons key1, key2, and key3 may be cited as an example for illustration; those skilled in the art, however, should appreciate that the number of functions given here should in no way be considered to be limitations of the scope of the present disclosure. What calls for special attention may be that: these buttons key1, key2, and key3 correspond to the plurality of functions AP1, AP2, and AP3 of the processing circuit 560 of the electronic device 500, respectively. In this embodiment, each button may be implemented by a resistive element as well as a switch, respectively. For example, the button key1 may include a resistive element R2 and a switch 440a, the button key2 may include a resistive element R3 and a switch 440b, and the button key3 may include a resistive element R4 and a switch 440c. The connecting manner of the abovementioned resistive elements R2, R3, and R4 and switches 440a, 440b, and 440c may be already shown in FIG. 4; further description may be therefore omitted herein for brevity.

As shown in FIG. 4, when one of the buttons key1, key2, and key3 may be pressed, the fourth pin 414 of the audio plug 410 may be further arranged for transmitting the control signals generated by the buttons key1, key2, and key3 (not shown). In other words, the electronic system 40 disclosed in the present embodiment may implement the plurality of buttons key1, key2, and key3 on the audio accessory 400 without increasing extra pins of the audio accessory 400, such that the electronic device 500 may execute the corresponding function (e.g., AP1, AP2, and AP3).

Please note that the abovementioned electronic device 300/500 may be an mp3 player, a CD player, a mobile phone, a personal digital assistant (PDA), a PDA phone, a smart phone, an eBook, or a handheld device, but the present disclosure may be not limited to these devices. The electronic device 300/500 may also be implemented by any electronic device equipped with multimedia playback functions. Furthermore, in the abovementioned embodiments, the electronic device 300/500 further includes a mechanical switch 390, for detecting whether a plug may be plugged into the audio jack 310—that is, for detecting whether the audio accessory 400 connects with the electronic device 500. When any plug (such as the audio plug 410) may be plugged into the audio jack 310, the mechanical switch 390 will be pressed by the audio plug 410 and contact with the third terminal 313 of the audio jack 310. At this time, the processing circuit 560 receives a grounding voltage (coupled to the grounding terminal GND), and thus determines that the audio plug 410 may be plugged into the audio jack 310. The abovementioned embodiments are presented merely for describing the present disclosure, and should not be considered as limitations of the present disclosure. In other embodiments, other electronic sensors may be adopted for replacing the mechanical switch 390 in order to achieve the abovementioned detecting function.

Figure 5:
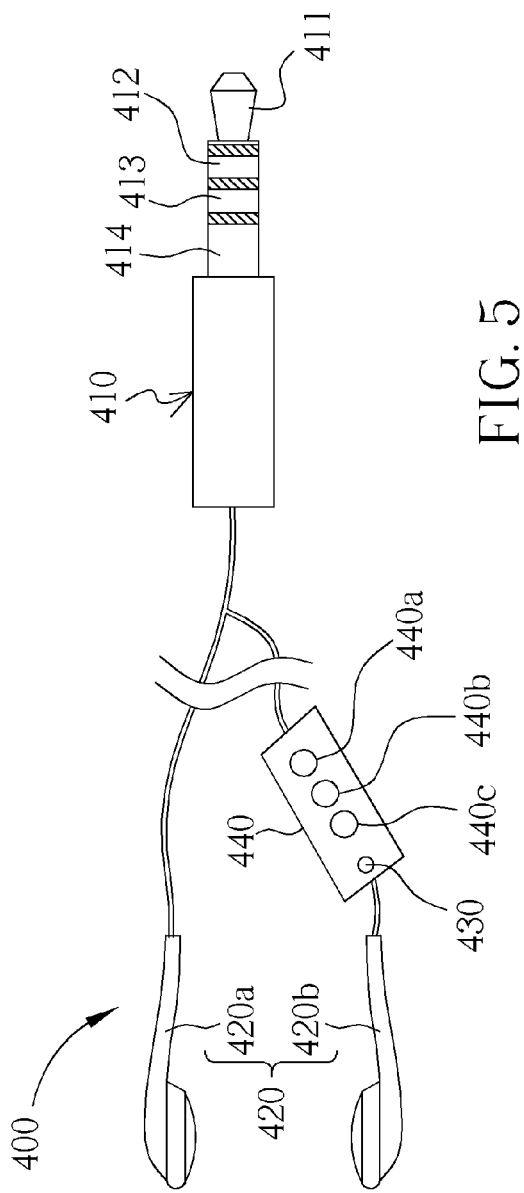
FIG. 5 is an external view of the audio accessory shown in FIG. 4.

Please refer to FIG. 5 together with FIG. 4. FIG. 5 may be an external view of the audio accessory 400 shown in FIG. 4. As shown in FIG. 5, the audio accessory 400 includes an audio plug 410, an audio output unit 420, and audio input unit 430, and a control element 440. As abovementioned, the audio plug 410 includes four pins 411~414 corresponding to the four terminals 311~314 of the audio jack 310 shown in FIG. 3. The audio output unit 420 includes the first output unit 420a and the second output unit 420b (such as a pair of headphones or a pair of speakers), respectively coupled to the first pin 411 and the second pin 412. The audio input unit 430 (such as a microphone) may be coupled to the fourth pin 414, for receiving the audio input signal MIC. In addition, the control element 440 includes three buttons key1, key2, and key3, wherein these buttons key1, key2, and key3 correspond to the plurality of functions AP1, AP2, and AP3 of the processing circuit 560 of the electronic device 500 shown in FIG. 4, respectively.

Figure 6:
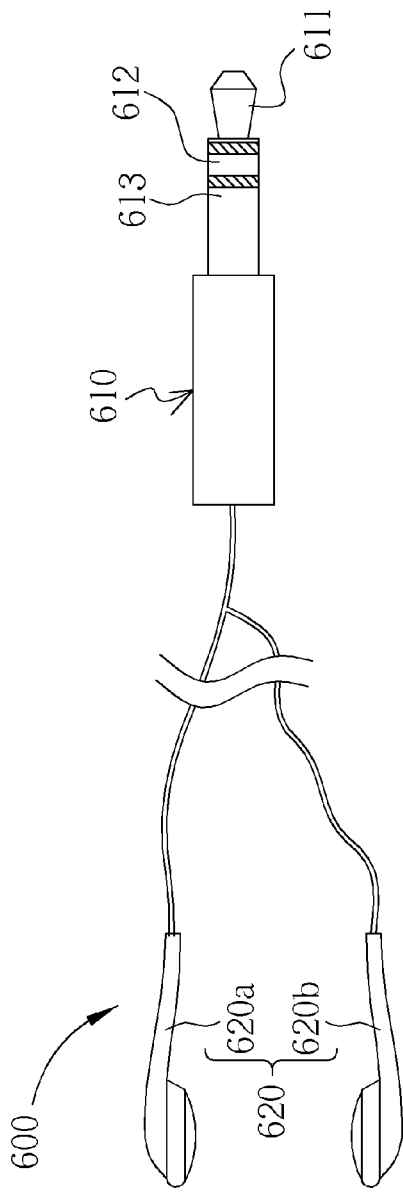
FIG. 6 is an external view of another audio accessory.

Please refer to FIG. 6. FIG. 6 may be an external view of another audio accessory 600. As shown in FIG. 6, the audio accessory 600 includes an audio plug 610 and an audio output unit 620. What calls for special attention may be that: the difference between the audio accessory 600 and the audio accessory 400 shown in FIG. 5 may be that the audio plug 610 of the audio accessory 600 merely includes three pins 611~613 (no microphone pin), and the audio accessory 600 may be not equipped with the audio input unit 430 and the control element 440. The goal of implementing buttons via the microphone pin (e.g. the fourth pin 414) may be achieved by adopting the audio accessory 400 shown in FIG. 5, but the goal may not be achieved by adopting the audio accessory 600 shown in FIG. 6.

Figure 7:
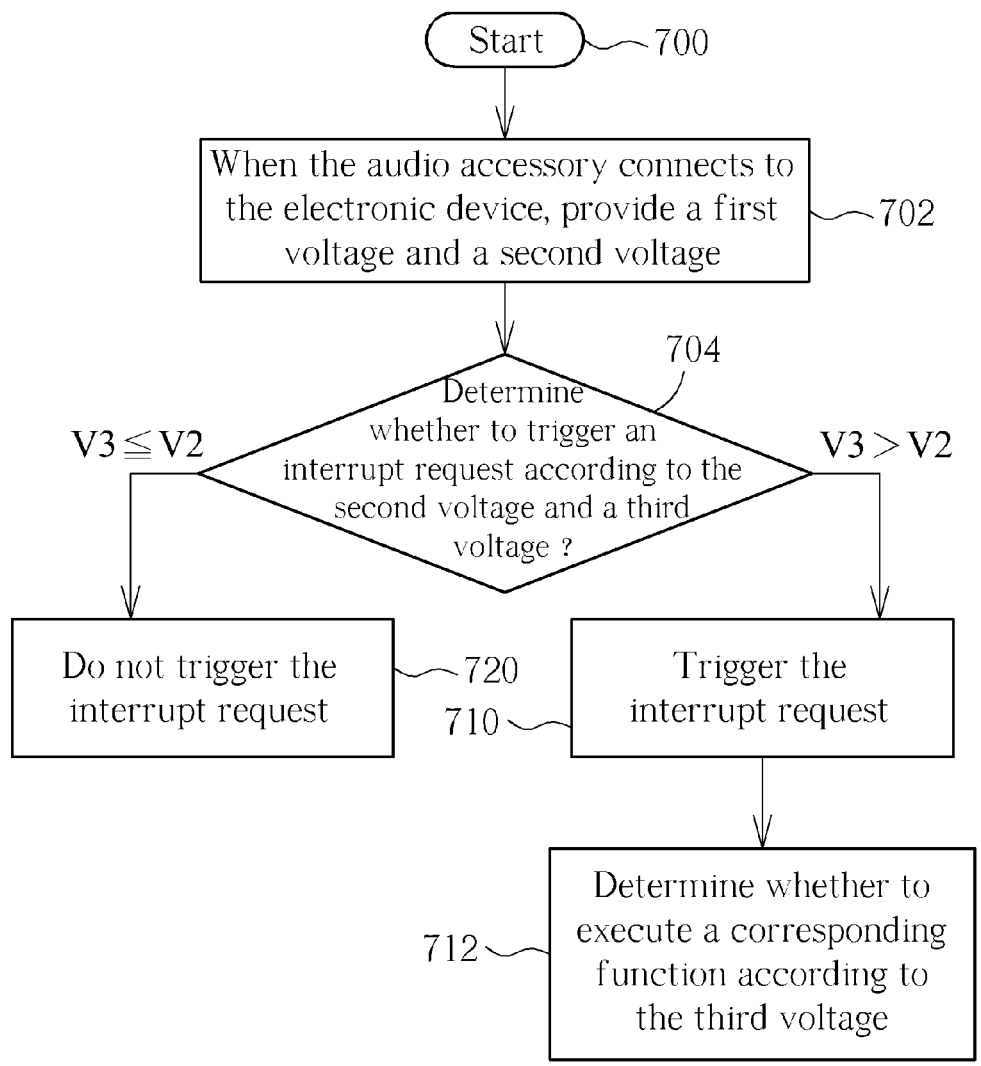
FIG. 7 is a flowchart illustrating a method for processing signals from an audio accessory according to an exemplary embodiment of the present disclosure.

Please refer to FIG. 7. FIG. 7 is a flowchart illustrating a method for processing signals from an audio accessory according to an exemplary embodiment of the present disclosure. The method may be applied to an electronic device comprising an audio jack for connecting with the audio accessory, wherein the audio jack includes a terminal for transmitting an audio input signal. Please note that the following steps are not limited to be performed according to the exact sequence shown in FIG. 7 if a roughly identical result may be obtained. The method includes, but may be not limited to, the following steps:

Step S700: Start.

Step S702: When the audio accessory connects to the electronic device, provide a first voltage and a second voltage.

Step S704: Determine whether to trigger an interrupt request according to the second voltage and a third voltage, wherein the second voltage may be coupled to the terminal and may be generated according to the first voltage. When the third voltage may be greater than the second voltage, go to Step S710; otherwise, go to Step S720.

Step S710: Trigger the interrupt request. After that, go to Step S712.

Step S712: When the interrupt request may be received, determine whether to execute a corresponding function according to the third voltage.

Step S720: Do not trigger the interrupt request.

How each element operates may be known by combining the steps shown in FIG. 7 and the elements shown in FIG. 3. Please note that the step S702 may be executed by the power supply unit 320, the steps S704, S710, and S720 may be executed by the determining circuit 330, and the step S712 may be executed by the executing circuit 340.

Figure 8:
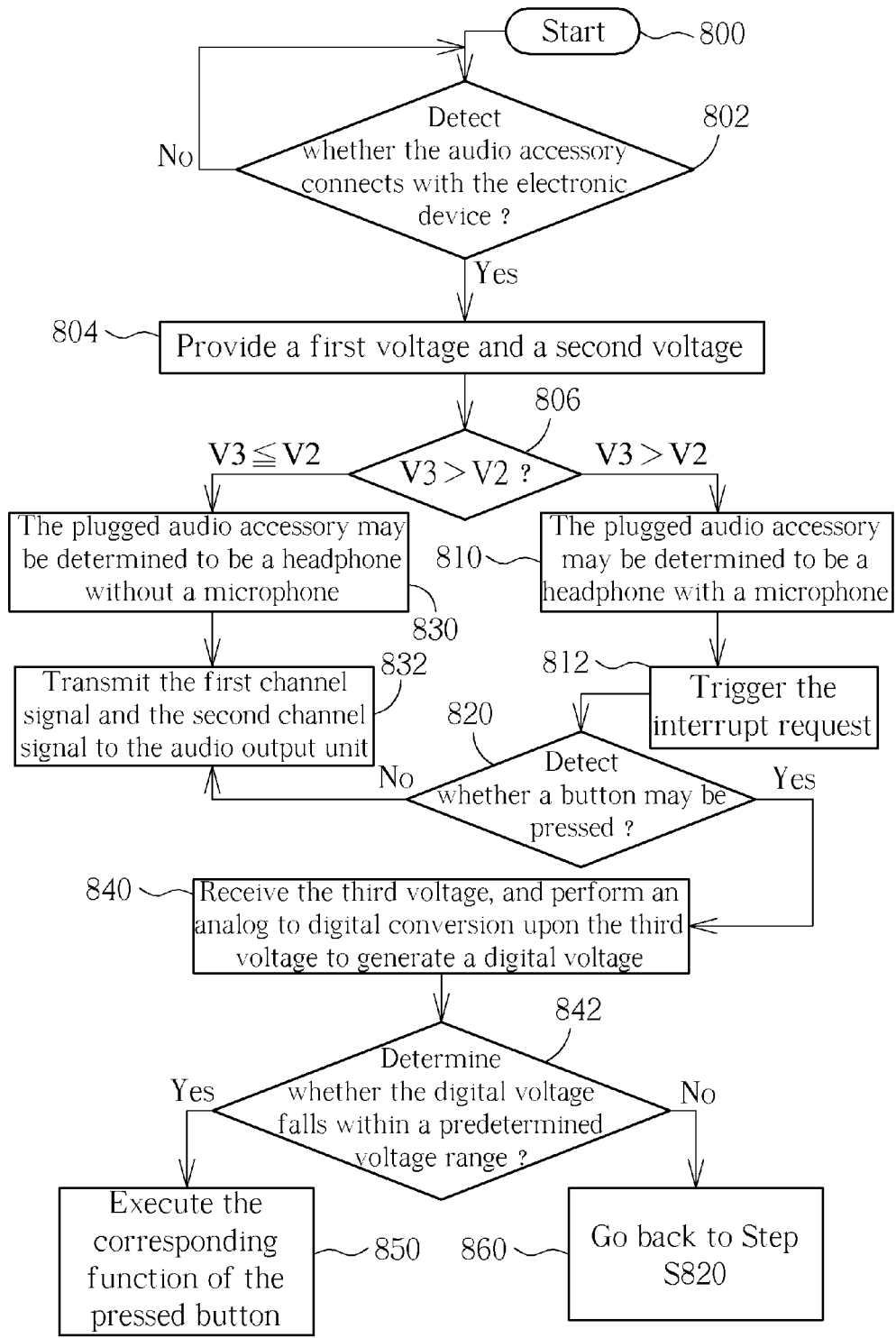
FIG. 8 is a flowchart illustrating a method for processing signals from an audio accessory according to another exemplary embodiment of the present disclosure.

Please refer to FIG. 8. FIG. 8 is a flowchart illustrating a method for processing signals from an audio accessory according to another exemplary embodiment of the present disclosure. The method may be applied to an electronic device comprising an audio jack for connecting with the audio accessory. Please note that the following steps are not limited to be performed according to the exact sequence shown in FIG. 8 if a roughly identical result may be obtained. The method includes, but may be not limited to, the following steps:

Step S800: Start.

Step S802: Detect whether the audio accessory connects with the electronic device. When the audio accessory connects with the electronic device, go to Step S804; otherwise, repeat Step S802.

Step S804: When the audio accessory connects with the electronic device, provide a first voltage and a second voltage.

Step S806: Compare the second voltage with the third voltage. When the third voltage may be greater than the second voltage, got to Step S810; otherwise, go to step S830.

Step S810: The plugged audio accessory may be determined to be a headphone with a microphone. After that, go to Step S812.

Step S812: Trigger the interrupt request.

Step S820: When the interrupt request may be received, detect whether a button may be pressed. When any one button may be pressed, go to step S840; otherwise, go to step S832.

Step S830: The plugged audio accessory may be determined to be a headphone without a microphone. After that, go to step S832.

Step S832: Transmit the first channel signal and the second channel signal to the audio output unit.

Step S840: Receive the third voltage, and perform an analog to digital conversion upon the third voltage to generate a digital voltage.

Step S842: Determine whether the digital voltage falls within a predetermined voltage range. When the digital voltage falls within the predetermined voltage range, go to Step S850; otherwise, go to step S860.

Step S850: Execute the corresponding function of the pressed button.

Step S860: Go back to Step S820.

In the following description, how each element operates may be known by combining the steps shown in FIG. 8 and the elements shown in FIG. 4, FIG. 5, and FIG. 6. First, in the step S802, the electronic device 500 may utilize the mechanical switch 390 to detect whether an audio accessory connects to the electronic device 500. When the audio accessory (such as 400 or 600) connects to the electronic device 500, the power supply unit 320 provides the first voltage V1 and the second voltage V2 (the step S804). After that, in the step S806, the comparator 532 of the determining circuit 530 may compare the second voltage V2 with the third voltage V3. In the following, two conditions may be cited for illustration. Under the first condition, the third voltage V3 may be not greater than the second voltage V2, which means that the plugged audio accessory may be a headphone without a microphone (e.g. the audio accessory 600 shown in FIG. 6). At this time, the determining circuit 530 will not trigger the interrupt request INT, and the audio accessory 600 will transmit the first channel signal L and the second channel signal R to the audio input unit 620 (i.e. the steps S830 and S832). Under the second condition, the third voltage V3 may be greater than the second voltage V2, which means that the plugged audio accessory may be a headphone with a microphone (e.g. the audio accessory 400 shown in FIG. 4 and FIG. 5). At this time, the determining circuit 530 will trigger the interrupt request INT (i.e. the steps S810 and S812). Afterwards, in the step S820, when the interrupt request INT may be received by the executing circuit 540, the detecting circuit 550 will use the third voltage V3 to detect whether any one of the buttons key1, key2, and key3 of the control element 440 may be pressed. When any one of the buttons key1, key2, and key3 of the control element 440 may be pressed, the analog-to-digital converter 552 of the detecting circuit 550 receives the third voltage V3, and then performs an analog-to-digital conversion upon the third voltage V3 to generate the digital voltage Vdig (i.e. the step S840). After that, in the step S842, the processing circuit 560 may determine whether the digital voltage Vdig falls within a predetermined voltage range (such as the predetermined voltage range defined in FIG. 10). In the step S850, when the digital voltage Vdig falls within the predetermined voltage range, the processing circuit 560 may execute the function (e.g. AP1, AP2, and AP3) corresponding to the digital voltage Vdig generated from the pressed button. When the digital voltage Vdig does not fall within the predetermined voltage range, the process returns to the step S820 in order to continue detecting whether a button may be pressed.

Figure 9:
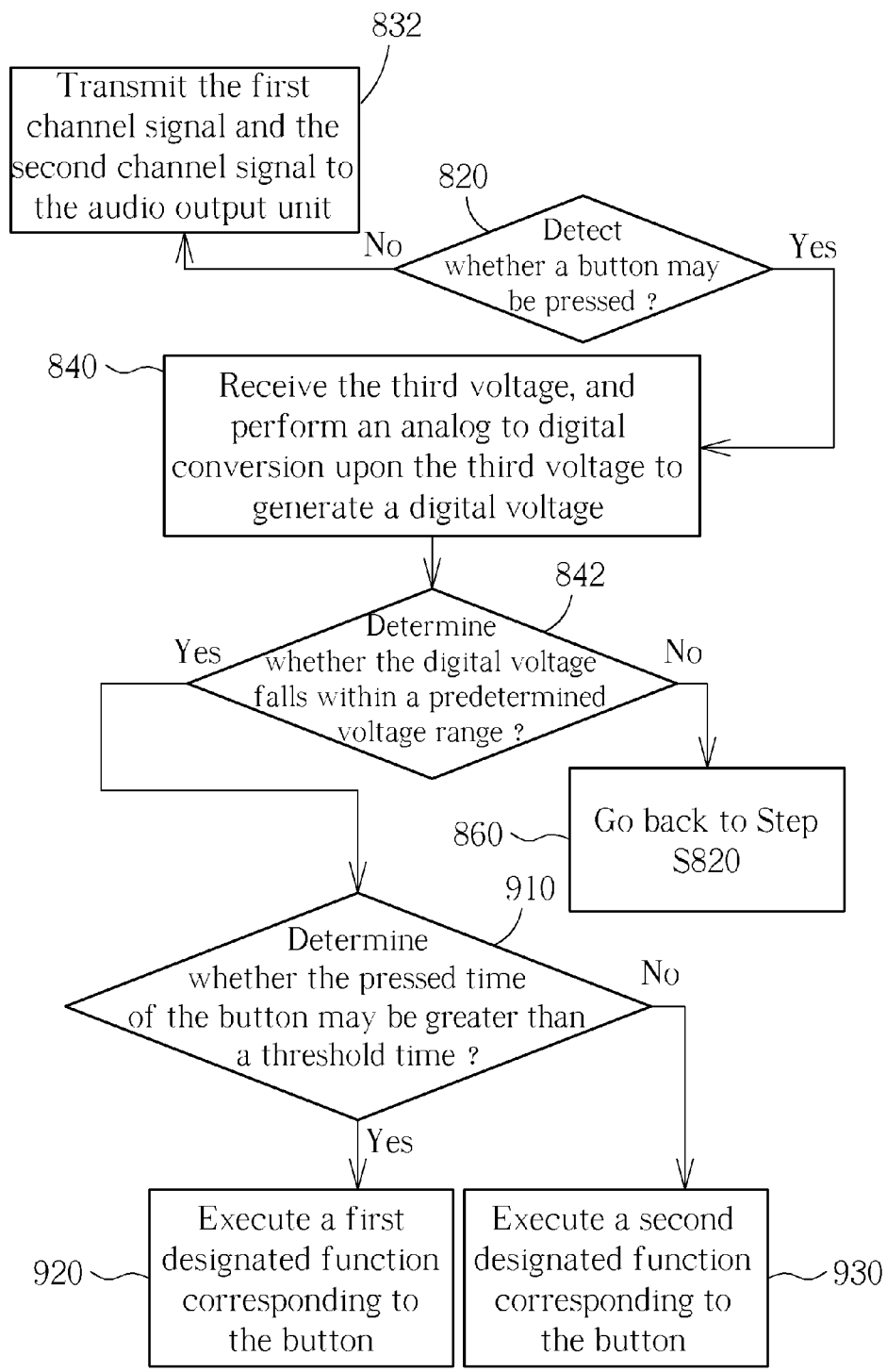
FIG. 9 is a flowchart illustrating a method for processing signals from an audio accessory according to yet another exemplary embodiment of the present disclosure.

Please note that the steps of the abovementioned flowchart may be merely a practical embodiment of the present disclosure, and in no way should be considered to be limitations of the scope of the present disclosure. The methods shown in FIG. 7 and FIG. 8 may include other intermediate steps or several steps may be merged into a single step without departing from the spirit of the present disclosure. As an illustration, there may be other steps included following the step S842 shown in FIG. 8. Please refer to FIG. 9. FIG. 9 may be a flowchart illustrating a method for processing signals from an audio accessory according to yet another exemplary embodiment of the present disclosure. Please note that the differences between FIG. 8 and FIG. 9 may be described herein. Furthermore, a section of the steps may be listed for brevity. The method includes, but may be not limited to, the following steps:

Step S820: When the interrupt request may be received, detect whether a button may be pressed. When any one button may be pressed, go to step S840; otherwise, go to step S832.

Step S832: Transmit the first channel signal and the second channel signal to the audio output unit.

Step S840: Receive the third voltage, and perform an analog to digital conversion upon the third voltage to generate a digital voltage.

Step S842: Determine whether the digital voltage falls within a predetermined voltage range. When the digital voltage falls within the predetermined voltage range, go to Step S910; otherwise, go to step S860.

Step S910: Determine whether the pressed time of the button may be greater than a threshold time. When the pressed time of the button may be greater than the threshold time, go to the step S920; otherwise, go to the step S930.

Step S920: Execute a first designated function corresponding to the button.

Step S930: Execute a second designated function corresponding to the button.

Step S860: Go back to the step S820.

Please note that the steps of the method shown in FIG. 9 are similar to the steps of the method shown in FIG. 8, but the difference between them may be that the method shown in FIG. 9 further includes the steps S910, S920, and S930. In this embodiment, in addition to determining whether the digital voltage Vdig falls within the predetermined voltage range (i.e. the step S842), the processing circuit 560 may be further used for determining whether the pressed time of the button may be greater than the threshold time (i.e. the step S910). When the pressed time of the button may be greater than the threshold time (for example, a long press of the button key1), the processing circuit 560 may execute the first designated function (such as 'next song') corresponding to the button key1; and when the pressed time of the button may be not greater than the threshold time (for example, a short press of the button key1), the processing circuit 560 may execute the second designated function (such as 'volume down') corresponding to the button key1. In the embodiment shown in FIG. 8, each button corresponds to a single function; however, in the embodiment shown in FIG. 9, each button corresponds to a plurality of functions.

In the following, how to determine which one of the buttons key1, key2, and key3 may be pressed according to the third voltage V3 (or the digital voltage Vdig) will be further described. Please refer to FIG. 4. Under a first condition, when the button key1 of the control element 440 shown in FIG. 4 may be pressed so as to turn on the switch 440a, the resistive element R2 may be electrically connected to the internal resistor R5 of the audio input unit 430 in parallel and may be electrically connected to the resistive element R1 in series via the fourth pin 414 as well as the fourth terminal 314. Therefore, according to the Voltage Division Theorem, the generated third voltage V3 may be equal to a value derived from the following equation (1):

$$V3 = V1 \times \left[ \frac{\left(\frac{R2 \times R5}{R2 + R5}\right)}{R1 + \left(\frac{R2 \times R5}{R2 + R5}\right)} \right]. \tag{1}$$

Under a second condition, when the button key2 of the control element 440 shown in FIG. 4 may be pressed so as to turn on the switch 440b, the resistive elements R2 and R3 may be electrically connected to the internal resistor R5 of the audio input unit 430 in parallel and may be electrically connected to the resistive element R1 in series via the fourth pin 414 as well as the fourth terminal 314. Therefore, according to the Voltage Division Theorem, the generated third voltage V3 may be equal to a value derived from the following equation (2):

$$V3 = V1 \times \left\{ \frac{\left[\frac{(R2 + R3) \times R5}{(R2 + R3) + R5}\right]}{R1 + \left[\frac{(R2 + R3) \times R5}{(R2 + R3) + R5}\right]} \right\}. \tag{2}$$

Under a third condition, when the button key3 of the control element 440 shown in FIG. 4 may be pressed so as to turn on the switch 440c, the resistive elements R2, R3, and R4 may be electronically connected to the internal resistor R5 of the audio input unit 430 in parallel and may be electronically connected to the resistive element R1 in series via the fourth pin 414 as well as the fourth terminal 314. Therefore, according to the Voltage Division Theorem, the generated third voltage V3 may be equal to a value derived from the following equation (3):

$$V3 = V1 \times \left\{ \frac{\left[\frac{(R2 + R3 + R4) \times R5}{(R2 + R3 + R4) + R5}\right]}{R1 + \left[\frac{(R2 + R3 + R4) \times R5}{(R2 + R3 + R4) + R5}\right]} \right\}. \tag{3}$$

For example, assume that the first voltage V1 may be equal to 10V, the resistive element R1 has a resistance equal to 15 KΩ, the resistive element R2 has a resistance equaling 10 KΩ, the resistive element R3 has a resistance equaling 10 KΩ, the resistive element R4 has a resistance equaling 30 KΩ, and the internal resistor R5 has a resistance equaling 10 KΩ. As a result, when the button key1 may be pressed, the third voltage V3 should be equal to 2.5V; when the button key2 may be pressed, the third voltage V3 should be equal to 3.1V; and when the button key3 may be pressed, the third voltage V3 should be equal to 3.6V.

In one embodiment, the predetermined voltages that the buttons key1~key3 correspond to may be generated according to the abovementioned equations (1)~(3), and may be stored in the memory (not shown) of the electronic device 500 in advance. Therefore, the processing circuit 560 may be able to determine whether the corresponding button may be pressed based on whether the third voltage V3 (or the digital voltage Vdig) may be equal to the predetermined voltages stored in the memory in advance. In other embodiments, the processing circuit 560 may be able to determine whether the corresponding button may be pressed based on whether the third voltage V3 (or the digital voltage Vdig) falls within the predetermined voltage ranges (for example, falling between a maximum voltage and a minimum voltage) stored in the memory in advance, wherein the maximum voltage and the minimum voltage may be defined according to component errors, as shown in FIG. 10. Please refer to FIG. 10. FIG. 10 (including sub-diagrams 10A and 10B) may be a diagram illustrating an embodiment of the predetermined voltage ranges mentioned in FIG. 8 or FIG. 9, wherein the predetermined voltage ranges may be defined by analog representations in the sub-diagram 10A, while the predetermined voltage ranges may be defined by digital representations in the sub-diagram 10B. As shown in 10A, when the button key1 may be pressed, the predetermined voltage range should fall within 2.3V~2.7V; wherein when the button key2 may be pressed, the predetermined voltage range should fall within 2.9V~3.3V; and when the button key3 may be pressed, the predetermined voltage range should fall within 3.4V~3.8V. Moreover, the predetermined voltage ranges shown in the sub-diagram 10A may be transferred into digital representations in the sub-diagram 10B.

The abovementioned embodiments may be presented merely for describing the features of the present disclosure, and in no way should be considered to be limitations of the scope of the present disclosure. In summary, the present disclosure provides an electronic device, an electronic system, and a related method for processing signals from an audio accessory. First, the second voltage and the voltage of the microphone pin (i.e. the third voltage) may be used for determining the type of plugged-in audio accessory, so as to determine whether to trigger the interrupt request to enable the button detecting function. After that, by detecting whether the voltage of the microphone pin falls within a predetermined voltage range (or meets a predetermined voltage), whether the corresponding button may be pressed may be determined in order to determine whether to execute the function corresponding to the pressed button. As a result, under a condition that extra pins of the audio accessory may be not increased, the microphone pin (i.e. the fourth pin 414) may be used for implementing a plurality of buttons on the conventional audio accessory, such that the electronic device may be capable of executing the corresponding function. Furthermore, by determining whether the pressed time of each button may be greater than a threshold time (for example, a long press of the button or a short press of the button), each button may correspond to a plurality of functions. Therefore, more additional functions may be given to the electronic device without increasing manufacturing costs of the electronic device and the audio accessory, which brings more convenience to users.

Those skilled in the art will readily observe that numerous modifications and alterations of the device and method may be made while retaining the teachings of the disclosure. Accordingly, the above disclosure should be construed as limited by the metes and bounds of the appended claims.

What is claimed is:

1. An electronic device, comprising:
   an audio jack, arranged for transmitting an audio input signal, wherein the electronic device is configured to connect with an audio accessory via the audio jack;
   a power supply unit, coupled to the audio jack, arranged for providing a first voltage to the audio jack and a second voltage when the audio accessory connects to the electronic device;
   a determining circuit, coupled to the power supply unit and the audio jack, arranged for receiving the second voltage and a third voltage, and for determining whether to trigger an interrupt request according to the second voltage and the third voltage, wherein the third voltage is coupled to the audio jack and is generated according to the first voltage; and
   an executing circuit, coupled to the determining circuit and the power supply unit, arranged for determining whether to execute a corresponding function according to the third voltage when the interrupt request is received to enable the executing circuit to detect the third voltage.

2. The electronic device of claim 1, wherein the executing circuit comprises:
   a detecting circuit, coupled to the determining circuit, arranged for performing an analog to digital conversion upon the third voltage to generate a digital voltage when the interrupt request is received; and
   a processing circuit, coupled to the detecting circuit and the audio jack, arranged for determining whether to execute the corresponding function according to at least the digital voltage.

3. The electronic device of claim 2, wherein the processing circuit is further arranged for determining whether the digital voltage falls within a predetermined voltage range; and the processing circuit executes the corresponding function when the digital voltage falls within the predetermined voltage range.

4. The electronic device of claim 2, wherein the audio accessory comprises at least one button, and the processing circuit is further arranged for determining whether a pressed time of the button is greater than a threshold time to generate a determining result; and the processing circuit determines whether to execute the corresponding function according to the digital voltage and the determining result.

5. The electronic device of claim 1, further comprising:
   a resistive element, coupled between the first voltage and the audio jack, arranged for generating the third voltage according to the first voltage.

6. The electronic device of claim 1, wherein the determining circuit comprises:
   a comparator, coupled to the power supply unit, the audio jack, and the executing circuit, arranged for comparing the second voltage with the third voltage to generate a comparing result, and for determining whether to trigger the interrupt request according to the comparing result.

7. The electronic device of claim 1, wherein the electronic device may be an mp3 player, a CD player, a mobile phone, a personal digital assistant (PDA), a PDA phone, a smart phone, an eBook, or a handheld device.

8. An electronic system, comprising:
   an audio accessory, comprising:
   an audio plug, comprising a first pin for transmitting a first channel signal, a second pin for transmitting a second channel signal, a third pin coupled to a ground terminal, and a fourth pin for transmitting an audio input signal;
   an audio output unit, coupled to the first pin and the second pin, arranged for outputting the first channel signal and the second channel signal;
   an audio input unit, coupled to the fourth pin, arranged for receiving the audio input signal; and
   a control element, coupled between the audio input unit and the fourth pin of the audio plug, comprising at least one button; and
   an electronic device, comprising:
   an audio jack, comprising a first terminal corresponding to the first pin of the audio plug, a second terminal corresponding to the second pin, a third terminal corresponding to the third pin, and a fourth terminal corresponding to the fourth pin, wherein the electronic device connects with the audio plug of the audio accessory via the audio jack;
   a power supply unit, coupled to the fourth terminal of the audio jack, arranged for providing a first voltage to the fourth terminal of the audio jack and a second voltage when the audio accessory connects to the electronic device;
   a determining circuit, coupled to the power supply unit and the fourth terminal of the audio jack, arranged for receiving the second voltage and a third voltage, and for determining whether to trigger an interrupt request according to the second voltage and the third voltage, wherein the third voltage is coupled to the fourth terminal and is generated according to the first voltage; and
   an executing circuit, coupled to the determining circuit and the power supply unit, arranged for determining whether to execute a corresponding function according to the third voltage when the interrupt request is received to enable the executing circuit to detect the third voltage.

9. The electronic system of claim 8, wherein the executing circuit comprises:
   a detecting circuit, coupled to the determining circuit, arranged for performing an analog to digital conversion upon the third voltage to generate a digital voltage when the interrupt request is received; and
   a processing circuit, coupled to the detecting circuit and the audio jack, arranged for determining whether to execute the corresponding function according to at least the digital voltage, wherein the function corresponds to the button.

10. The electronic system of claim 9, wherein the processing circuit is further arranged for determining whether the digital voltage falls within a predetermined voltage range; and the processing circuit executes the corresponding function when the digital voltage falls within the predetermined voltage range.

11. The electronic system of claim 9, wherein the processing circuit is further arranged for determining whether a pressed time of the button is greater than a threshold time to generate a determining result; and the processing circuit determines whether to execute the corresponding function according to the digital voltage and the determining result.

12. The electronic system of claim 8, wherein the electronic device further comprises:
   a resistive element, coupled between the first voltage and the fourth terminal of the audio jack, arranged for generating the third voltage according to the first voltage.

13. The electronic system of claim 8, wherein the determining circuit comprises:
   a comparator, coupled to the power supply unit, the fourth terminal of the audio jack, and the executing circuit, arranged for comparing the second voltage with the third voltage to generate a comparing result, and for determining whether to trigger the interrupt request according to the comparing result.

14. The electronic system of claim 8, wherein the button comprises:
   a resistive element, coupled to the fourth pin of the audio plug; and
   a switch, coupled between the resistive element and the audio input unit.

15. The electronic system of claim 8, wherein the electronic device may be an mp3 player, a CD player, a mobile phone, a personal digital assistant (PDA), a PDA phone, a smart phone, an eBook, or a handheld device.

16. A method for processing signals from an audio accessory, applied to an electronic device comprising an audio jack for connecting with the audio accessory, the audio jack comprising a terminal for transmitting an audio input signal, the method comprising the following steps:
   when the audio accessory connects to the electronic device, providing a first voltage and a second voltage;
   determining whether to trigger an interrupt request according to the second voltage and a third voltage, wherein the second voltage is coupled to the terminal and is generated according to the first voltage; and
   determining whether to execute a corresponding function according to the third voltage when the interrupt request is received to enable detection of the third voltage.

17. The method of claim 16, wherein the step of determining whether to execute the corresponding function according to the third voltage when the interrupt request is received comprises:
   performing an analog to digital conversion upon the third voltage to generate a digital voltage when the interrupt request is received; and
   determining whether to execute the corresponding function according to at least the digital voltage, wherein the function corresponds to at least one button of the audio accessory.

18. The method of claim 17, further comprising:
   determining whether the digital voltage falls within a predetermined voltage range; and
   executing the corresponding function when the digital voltage falls within the predetermined voltage range.

19. The method of claim 17, further comprising:
   determining whether a pressed time of the button is greater than a threshold time to generate a determining result; and
   determining whether to execute the corresponding function according to the digital voltage and the determining result.

20. The method of claim 17, wherein the step of determining whether to trigger the interrupt request according to the second voltage and the third voltage comprises:
   comparing the second voltage with the third voltage to generate a comparing result; and
   determining whether to trigger the interrupt request according to the comparing result.

* * * * *